US007504995B2

(12) United States Patent
Lawrence et al.

(10) Patent No.: US 7,504,995 B2
(45) Date of Patent: Mar. 17, 2009

(54) METHOD AND SYSTEM FOR CIRCULAR POLARIZATION CORRECTION FOR INDEPENDENTLY MOVING GNSS ANTENNAS

(75) Inventors: David Gary Lawrence, Santa Clara, CA (US); Michael L. O'Connor, Redwood City, CA (US)

(73) Assignee: Novariant, Inc., Fremont, CA (US)

( * ) Notice: Subject to any disclaimer, the term of this patent is extended or adjusted under 35 U.S.C. 154(b) by 493 days.

(21) Appl. No.: 10/916,198

(22) Filed: Aug. 11, 2004

(65) Prior Publication Data

US 2006/0033657 A1 Feb. 16, 2006

(51) Int. Cl.
*G01S 5/02* (2006.01)

(52) U.S. Cl. .................................................. 342/357.11

(58) Field of Classification Search ................................ 342/357.01–357.17, 361, 381; 701/4, 215, 701/216; 244/171
See application file for complete search history.

(56) References Cited

U.S. PATENT DOCUMENTS

| | | | | | |
|---|---|---|---|---|---|
| 4,914,735 | A | * | 4/1990 | Ichiyoshi | 342/125 |
| 5,101,356 | A | * | 3/1992 | Timothy et al. | 701/213 |
| 5,347,286 | A | * | 9/1994 | Babitch | 342/359 |
| 5,446,465 | A | * | 8/1995 | Diefes et al. | 342/357.08 |
| 5,461,388 | A | * | 10/1995 | Applegate et al. | 342/357.02 |
| 5,485,156 | A | * | 1/1996 | Manseur et al. | 342/77 |
| 5,534,875 | A | * | 7/1996 | Diefes et al. | 342/357.11 |
| 5,543,804 | A | * | 8/1996 | Buchler et al. | 342/357.08 |
| 5,557,284 | A | * | 9/1996 | Hartman | 342/357.03 |
| 5,587,714 | A | * | 12/1996 | Chu et al. | 342/354 |
| 5,825,326 | A | * | 10/1998 | Semler et al. | 342/357.04 |
| 5,903,237 | A | * | 5/1999 | Crosby et al. | 342/359 |
| 5,952,961 | A | * | 9/1999 | Denninger | 342/357.08 |
| 6,005,514 | A | * | 12/1999 | Lightsey | 342/365 |
| 6,114,988 | A | * | 9/2000 | Schipper et al. | 342/357.06 |
| 6,163,754 | A | * | 12/2000 | Zhang et al. | 701/215 |
| 6,199,000 | B1 | | 3/2001 | Keller et al. | |
| 6,211,821 | B1 | * | 4/2001 | Ford | 342/357.11 |
| RE37,256 | E | * | 7/2001 | Cohen et al. | 342/357.06 |
| 6,266,582 | B1 | * | 7/2001 | Bruckner | 701/4 |
| 6,720,914 | B2 | * | 4/2004 | Toda et al. | 342/357.04 |
| 6,727,846 | B1 | * | 4/2004 | Brown | 342/357.06 |
| 6,754,584 | B2 | * | 6/2004 | Pinto et al. | 701/215 |

(Continued)

OTHER PUBLICATIONS

Lawrence, David, et al., "Maintaining GPS Positioning in Steep Turns Using Two Antennas", ION GPS-95, Palm Springs, CA, Sep. 1995.

(Continued)

*Primary Examiner*—Thomas H Tarcza
*Assistant Examiner*—Nga X Nguyen
(74) *Attorney, Agent, or Firm*—Houston Eliseeva LLP

(57) ABSTRACT

A system and method for compensating for changes in relative antenna attitude in a single-receiver position detection system, such as a differential carrier phase GPS system, utilizes sensor input to detect changes in the relative attitude of at least two antennas or an antenna positioner, such as an motorized actuator or operator, that orients or re-orients the antennas to a predetermined orientation. The changes in the detected relative carrier phase due to the right hand circular polarized nature of the carrier signals are thus corrected. In this way, the high positional accuracy associated with kinematic GPS systems, for example, can be achieved even when the system's antennas are not constrained by a common rigid body, for example.

38 Claims, 7 Drawing Sheets

U.S. PATENT DOCUMENTS

| | | | | |
|---|---|---|---|---|
| 7,076,342 | B2 * | 7/2006 | Fukuda et al. | 701/4 |
| 7,382,313 | B1 * | 6/2008 | Goad | 342/357.02 |
| 2002/0072852 | A1 * | 6/2002 | Fuchs et al. | 701/213 |
| 2004/0176882 | A1 * | 9/2004 | Fukuda et al. | 701/4 |
| 2005/0056730 | A1 * | 3/2005 | Nagayama et al. | 244/175 |
| 2005/0110678 | A1 * | 5/2005 | Doi | 342/372 |

OTHER PUBLICATIONS

Lawrence, David, "Aircraft Landing Using GPS—Development and Evaluation of a Real Time System for Kinematic Positioning Using the Global Positioning System", Sep. 1996.

Teague, Edward Harrison, "Flexible Structure Estimation and Control Using The Global Positioning System", May 1997.

* cited by examiner

METHOD AND SYSTEM FOR CIRCULAR POLARIZATION CORRECTION FOR INDEPENDENTLY MOVING GNSS ANTENNAS

BACKGROUND OF THE INVENTION

The NAVSTAR Global Positioning System (GPS) is a satellite-based navigation system developed by the U.S. military in the 1970's. The GPS space segment consists of a nominal constellation of 24 satellites, four satellites in each of 6 orbit planes.

Originally conceived as a navigation aid for ships, the use of the system has become ubiquitous both within the military and within civilian and commercial applications. For example, many cars today are outfitted with GPS navigation systems that locate the car on a displayed digital map to the driver. In commercial applications, GPS systems are used for surveying in addition to controlling vehicles such as graders during the laying of road beds. On these vehicles, the antennas are sometimes located on the blade in addition to the cab. In order to ensure good satellite visibility, however, the antennas must be placed on high poles to provide line of sight to the required four satellites.

The Standard Positioning Service (SPS) signal is currently provided to civilian users of GPS. It is made up of an L-band carrier at 1575.42 megahertz (MHz) (referred to as the L1 carrier) modulated by a pseudorandom noise (PRN) C/A (clear acquisition) code. The satellites are distinguished from each other by their unique C/A codes, which are nearly orthogonal to each other. The C/A code has a chip rate of 1.023 MHz and is repeated every millisecond. A 50 bit per second data stream is modulated with the C/A code to provide satellite ephemeris and health information. The phase of the C/A code provides a measurement of the range to the satellite. This range includes an offset due to the receiver clock and is therefore referred to as the pseudo-range. Since the receiver clock error is common to all satellites, it represents an additional unknown to be solved for along with position. Consequently, to perform a three dimensional position fix, a GPS position detection system traditionally requires a minimum of four satellites (one satellite phase measurement for each of the unknowns). The positioning accuracy provided by the SPS is on the order of ten meters. Due to geometric effects, vertical errors are typically larger than horizontal errors.

Other global positioning systems exist in addition to the NAVSTAR GPS. Within the GNSS (Global Navigation Satellite System) are the Russian GLONASS and the forthcoming European GALILEO GPS systems. Position detection systems can use one or more of these systems to generate position information.

Differential GPS (DGPS) is a variant method for providing higher positional accuracy. If a reference GPS receiver is placed at a known location on the ground, the bulk of the errors associated with the satellite phase measurements can be estimated. Phase corrections can be calculated and broadcast to a roving GPS user. Since most errors are highly correlated in a local area, the roving user's position solution after applying the corrections will be greatly improved.

Traditional DGPS systems use the C/A code phase measurements to arrive at position solutions. These systems provide 95% positioning accuracies on the order of a few meters. The precision of the L1 carrier phase measurement has been used to improve the performance of DGPS. Using carrier smoothed code techniques, DGPS performance improves to the meter level.

Further improvements are achieved through the use of kinematic DGPS. Kinematic DGPS, or differential carrier phase GPS, refers to using the differentially corrected carrier phase measurements, possibly in addition to the code phase. Due to the short wavelength of the L1 carrier phase (about 19 cm), these measurements are extremely precise, on the order of several millimeters. Although the measurements are corrupted slightly by the errors sources, the potential accuracy of kinematic positioning is on the centimeter level. However, the carrier phase measurement has an integer cycle ambiguity associated with it. This ambiguity arises from the fact that each cycle of the carrier phase is indistinguishable from the others; before centimeter level positioning can be achieved, the ambiguity must be resolved.

Some kinematic DGPS systems use a common clock to process carrier signal information from multiple antennas. This allows for position solutions with carrier signals from less than four satellites if relative delays associated with receiving the broadcast phases from the antennas are known. Typically, this delay is determined by measuring the length or delay associated with a fixed length cable that extends between the reference GPS receiver and the slave receiver.

At these precisions, another ambiguity arises from the relationship between the attitude or orientation of the antenna and the nature of the GPS signals. The transmitted GPS signals are righthand circularly polarized (RHCP). Therefore, GPS receive antennas are designed to receive RHCP signals. The measured carrier phase of a circularly polarized signal is a function not only of the distance between the transmit and receive phase centers, but also of the relative orientation of the antennas and particularly the antennas' yaw or rotation about their boresights. Thus, unknowns concerning the orientation or attitude of the antennas can result in ranging errors that become relevant at the resolutions associated with kinematic DGPS.

Traditionally, kinematic GPS applications do not correct for the effects associated with antenna orientation. When the boresights of all of the receive antennas are parallel and constrained to rotate as a single rigid body, the correction is common to all satellites. It, therefore, affects only the differential clock error or line bias, not the position or attitude solution. However, if the yaw angle between antenna boresights becomes large, a RHCP correction should be applied.

One strategy is to find a correction for each transmit and receive antenna pair. The receive antennas are assumed to be flat patch antennas; the results can be generalized for other types of antennas given their off-boresight phase characteristics.

In kinematic GPS applications, the phase measured from one antenna is typically subtracted from that measured at another antenna. For kinematic positioning, the phase measured at the reference station is subtracted from that measured at the roving antenna. For attitude determination, the phase measured at a master antenna is subtracted from those measured at slave antennas. Thus, another method for applying a RHCP correction is to apply a correction to the single differenced phases. This correction is a function of the two receive antenna orientations and the line-of-sight to the transmit antenna. The incoming signal and the receive antennas are assumed to be circularly polarized in the derivation of this correction. Although less general than the previous one, this correction is sufficient for most applications.

SUMMARY OF THE INVENTION

The problem with existing single receiver, common clock, multiple-antenna DGPS systems, however, is that they assume that there are no changes in relative antenna attitude between measurements. Thus, these systems have been limited to applications in which all of the antennas are fixed to a common rigid or semirigid body, such as orientation determination. In short, RHCP correction is deemed to be negligible since antennas have been more or less fixed relative to each other.

The present invention concerns a system and method for compensating for changes in relative antenna attitude in a single-receiver position detection system, such as a differential carrier phase GPS system. The method and system utilize sensor input to detect changes in the relative attitude of at least two antennas or an antenna positioner that orients or re-orients the antennas to a predetermined orientation. The changes in the detected relative carrier phase are then corrected. In this way, the high positional accuracy associated with differential carrier phase GPS systems, for example, can be achieved even with satellite visibility constraints.

In general, according to one aspect, the invention features a system for carrier phase correction due to changes in relative antenna attitude. This is provided in a position detection system that comprises antennas for receiving carrier signals, such as GPS signals, and a receiver for processing carrier signal information from the antennas in response to a common clock signal.

The inventive carrier phase correction system comprises an antenna attitude sensor for detecting changes in relative attitude, such as yaw, for the antennas. The receiver then determines position in response to the carrier signal information and the detected changes in the relative attitude of the antennas.

In one embodiment, the antenna attitude sensor measures changes in the relative attitude of the antennas. Such a sensor can include magnetic sensors, inertial sensors, potentiometers, encoders, vision-based sensors, linear sensors from which angles can be derived, or sensors that indirectly measure the relative attitude of the antennas by monitoring instructions indicating the changes in the relative attitude. To obtain relative attitude, a sensor is typically required for each antenna unless the attitude of one of the antennas is predetermined, such as fixed and known or otherwise specified.

In the typical embodiment, the GPS carrier signals are generated by a global navigation satellite system, such as NAVSTAR, the global orbiting navigation satellite system (GLONASS), and/or the Galileo system.

In one implementation, the antennas are subject to relative attitude changes because they are mounted on different platforms capable of relative angular movement. In one example, the antennas are mounted on a vehicle with a first one of the antennas rigidly mounted relative to a frame of the vehicle and a second one of the antennas mounted to a part of the vehicle that moves relative to the frame. A road grader is one example, with one of the antennas being mounted on the blade and the other being mounted on the road grader's cab. In other examples, the antennas are mounted on a main vehicle frame and its trailer.

In some embodiments, relative attitude changes are directly detected. In other embodiments, relative attitude changes are derived by detecting changes in absolute antenna attitude, and then comparing the changes for the separate antennas. For example, the antenna attitude sensor is a global positioning system based attitude sensor, in one example, that uses the carrier signal information from the antennas to determine attitude.

In general, according to another aspect, the invention features a system for carrier phase correction for a position detection system. The system comprises antennas for receiving carrier signals in which the antennas are subject to changes in relative attitude. A receiver is further provided for processing carrier signal information from the antennas in response to a common clock signal to determine positions of the antennas.

According to the invention, the carrier phase correction system comprises an antenna positioner that orients at least one of the antennas to avoid changes in relative attitude of the antennas. The receiver then determines position in response to the carrier signal information after the antenna positioner controls the attitude of at least one of the antennas to minimize changes in the relative attitude of the antennas.

In effect, this embodiment is directed to a system that controls the positioning of the antennas to avoid relative attitude changes even if the platforms to which the antennas are fixed may change relative to each other. In some embodiments, the positioner is an actuator. The positioner preferably at least controls the antenna's yaw, or rotation around its boresight. In some implementations, the positioner also controls the pitch and roll of the antenna. In one example, the positioner is an operator that performs a relative attitude positioning protocol such as orienting both antennas vertically or pointing the two or more antennas towards each other. This protocol is typically specified via a computer interface of the position detection system or in a manual for the system. Further, a user interface of the position detection system is provided with an input that the operator selects when the antennas have been oriented according to the protocol, thereby trigging the system to determine a position solution. In still other embodiments, the positioner comprises an attitude sensor for detecting an attitude of at least one of the antennas, the positioner actuator then automatically operating in response to this attitude sensor to actively orient the antenna.

In general, according to still another aspect, the invention features a position detection system comprising first and second sets of antennas for receiving carrier signals, with this second set of antennas being subject to changes in attitude relative to the first set of antennas. An antenna attitude compensator is provided for enabling carrier phase correction induced by changes in relative attitude between the first set of antennas and the second set of antennas. A receiver then processes the carrier signal information from the antennas in response to a common clock signal and the antenna attitude compensator.

In one embodiment, the antenna attitude compensator comprises an antenna attitude sensor for detecting changes in relative attitude of the antennas. The receiver then determines a position in response to this detected relative attitude.

In another embodiment, the antenna attitude compensator comprises an antenna positioner that controls an attitude of at least one of the antennas to avoid changes in relative attitude of the antennas. For one implementation, a first one of the antennas is on a mobile unit and a second one of the antennas is on a base unit. Carrier information is preferably transmitted over a transmission line between the mobile unit and the base station.

In a specific embodiment, the mobile unit and base station form a survey system that can locate the position of the base station and the mobile unit to a high accuracy in three-dimensional space. The advantage of the present embodiment is that only one of the base station and mobile unit is required to see four satellites in order to resolve its position. That is, if one of the units only receives carrier signals from three satellites, position can still be resolved to the accuracies provided by kinematic GPS systems.

In one embodiment, the antenna attitude compensator comprises an antenna attitude sensor for detecting changes in relative attitude of the antennas. The receiver then determines a position in response to the relative attitude of the antennas. In another embodiment, the antenna attitude compensator, comprises a positioner such as an actuator that points the antennas in a predetermined direction. For example, the antennas can be pointed toward each other or pointed so that they match each others' headings. In the simplest example, this actuator is an operator, whereas in other examples, automatic motorized or passive systems are used.

In general, according to another aspect, the invention features a positioned detection system, with first and second sets of antennas, which system comprises an antenna attitude compensator providing carrier phase correction induced by movement between the first set of antennas and the second set of antennas. A receiver then processes carrier signal information from the first set of antennas and the second set of antennas in response to a common clock signal. The receiver compensates for changes in attitude between the first set of antennas and the second set of antennas by determining attitude information and determining a position in response to the carrier signal information and the antenna attitude sensor.

The invention also concerns a survey system receiver that has a common clock module, which generates the common clock signal required to process the carrier signal information from the multiple, two or more, antennas received through antenna interfaces. This enables carrier phase kinematic GPS location of the antennas by a position solution module of the receiver.

In general, according to still another aspect, the invention features a position detection system providing for carrier phase correction. The position detection system comprises a base antenna and a mobile antenna. Each of these antennas receives carrier signals. A receiver then processes carrier signal information from the antennas in response to a common clock. The mobile antenna is capable of moving relative to the base antenna.

According to one aspect of the invention, an antenna attitude compensator is used to compensate for changes in relative attitude between the base antenna and the mobile antenna. The receiver then determines a position in response to the carrier signal information and the antenna attitude compensator.

The invention can also be characterized in the context of a method for detecting position. This method comprises receiving carrier signals with antennas and detecting changes in relative attitude of the antennas. Their carrier signal information is then processed to determine position in response to a common clock signal and the detected changes in relative attitude of the antennas.

Further, the invention can be characterized as a method for detecting position in which carrier signals are received at antennas and the antennas are individually positioned to maintain relative attitude of the antennas. Finally, the carrier signal information from the antennas is processed to determine position in response to a common clock signal.

In general according to another aspect, the invention features a position detection system for an articulated vehicle. It includes at least one vehicle antenna on the vehicle and at least one implement antenna on the implement. A heading sensor is further provided for determining a heading of the vehicle or the implement. Finally, a receiver determines an angle between the vehicle and the implement in response to carrier signal information from the vehicle antenna and the implement antenna and the heading.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
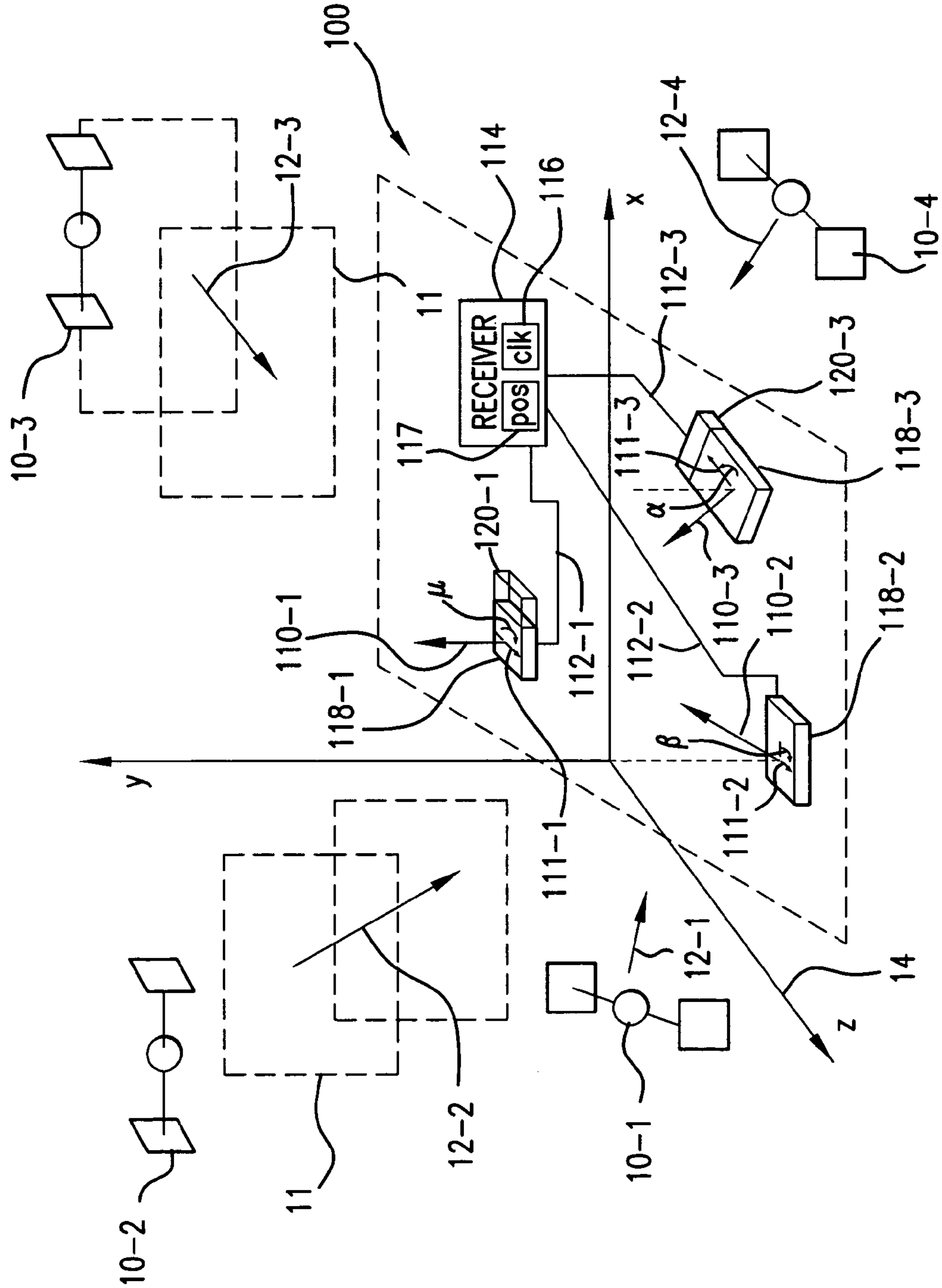
FIG. 1 is a schematic diagram showing antennas of the inventive differential carrier phase GPS system being subject to changes in relative attitude.

FIG. 1 is a schematic diagram illustrating a position detection system 100 that has been constructed according to the principles of the present invention.

In more detail, a number of satellites are provided by the global positioning system (10-1, 10-2, 10-3, and 10-4). In the preferred embodiment, these GPS satellites are satellites of the NAVSTAR, GLONASS, and/or Galileo systems. They each broadcast carrier signals 12-1, 12-2, 12-3, and 12-4 to enable receiver antenna systems to determine their position in a three-dimensional space represented by the x, y, and z coordinate axes 14.

The present invention is especially relevant to DGPS and kinematic GPS systems, in which carrier signal information is detected by multiple antennas but processed by a single receiver and in response to a common clock signal that is generated by the receiver 114.

Specifically, in the illustrated embodiment, antennas 110-1, 110-2, and 110-3 are located in the coordinate space 14. Each of the antennas receives carrier signals 12-1, 12-2, 12-3, and 12-4 and then transmits carrier signal information over cables, 112-1, 112-2, 112-3, or data communication paths to a receiver 114. This receiver 114 processes this carrier signal information in response to an internal clock signal, a common clock, generated by clock module 116. Thus, the accuracies associated with DPGS and specifically kinematic or differential carrier phase GPS systems are attainable.

It should be noted that the antenna system may have their own slave clocks that are used to process the carrier signal information. It is critical, however, to the invention that each of these slave clocks, essentially functions in response to a common clock signal such as the clock generated by clock module 116 at the receiver 114.

In more detail, a number of implementations exist for the common clock. Generally, the common clock means that the receiver 114 is not required to solve for a time unknown when solving for relative position of the antennas 110-1, 110-2, and 110-3. There are a number of ways to achieve this common clock processing. For example, down-conversion of the detected carrier signals can be performed for all antennas using the same local oscillator (LO) signal or local oscillators derived from, or phase locked to, a common oscillator. Alternatively, the carrier signals can be sampled using the same sampling clock. A combination of these two methods can further be used. Another example relies on the derivation of the phase of a common signal using independent clocks for processing that common signal. Specifically, one can daisy chain multiple dual antenna receivers between successive antennas such that the receivers process information from common antennas. Thus, since the receivers obtain the phase for a satellite carrier signal received on the same antenna, they can compensate for the difference in clocks between them. In still another example, a common signal is injected into all of the signals from the antennas and a measurement of the phase of that common signal made using each independent clock.

Each of the antennas 110-1, 110-2, and 110-3 are secured or mounted relative to a respective platform 118-1, 118-2, and 118-3. In some examples, these platforms 118-1, 118-2, 118-3 are a part or a frame of a vehicle. In other examples, they are a surveyor's tripod. In still other examples, the platforms are simply a base that allows the antenna to be set on the ground or attached to another structure.

The inventive kinematic DGPS system, however, is capable of addressing the situation in which these various platforms 118-1, 118-2, and 118-3 are not fixed to the same rigid body. As a result, the corresponding antennas 110-1, 110-2 and 110-3 are subject to relative changes in attitude.

As previously described, these relative changes in attitude can necessarily result in ranging errors if left uncompensated. Specifically, the circularly polarized (i.e., RHCP) nature of the plane waves 11 received from the satellites 10-1, 10-2, 10-3, and 10-4 results in ranging errors. Most of the errors are associated with errors in the yaw of the antennas 110-1 to 110-3. Often the yaw is characterized as the angle between the separate antennas' heading in the x-z plane, derived from the RHCP nature of the antennas. The antenna heading can be indicated by indicia 111-1, 111-2, 111-3 found on the outer casing of common flat patch antennas.

Such attitude variation is typically unacceptable for differential carrier phase GPS systems, which are typically utilized because of their centimeter positional accuracies. As a result, according to the present invention, some or all of the antennas 110-1, 110-2, and 110-3 are provided with antenna attitude compensators 120-1, 120-3. These compensators provide for carrier phase correction induced by changes in relative attitude between the antennas 110-1, 110-2, and 110-3.

Antenna Attitude Sensor

In one embodiment, the antenna attitude compensator comprises an antenna attitude sensor for detecting changes in relative attitude for the antennas 110-1, 110-2, and 110-3. This attitude information is then transmitted to the receiver 114, which then generates position information for the antennas 110-1, 110-2, 110-3 using a position solution module 117 that is compensated based on the relative attitudes of the antennas.

The following sets forth the compensation applied by the receiver 114.

In general, the incoming signal will be elliptically polarized if the transmit antenna boresight does not point directly at the receive antenna. For terrestrial users receiving satellite signals, the ellipticity is guaranteed not to exceed 1.2 dB, so the incoming signal can often be assumed to be circularly polarized. For applications involving pseudolites, the boresight of the transmit antenna may not point toward the receive antenna; in this case, the ellipticity should be modeled. Therefore, the RHCP correction is a function of the orientation of the receive antenna, the line-of-sight to the transmit antenna, and the ellipticity and orientation of the incoming signal.

To develop a correction for a transmit/receive pair, two coordinate frames are defined. A right handed orthogonal coordinate frame is attached to the receive antenna with the z direction aligned with the boresight. The y direction can be arbitrarily chosen normal to z; the x direction is then constrained. The second coordinate frame will be called the transmit frame. The transmit frame is defined such that the z axis points opposite the line-of-sight to the transmit antenna and the y axis points in the major axis direction of the incoming elliptically polarized signal. If the incoming signal is circularly polarized, this direction may be chosen arbitrarily. The arbitrary terms in the absolute correction will cancel when single and double differences are performed.

The output of a RHCP patch antenna can be simply modeled as the E-field component in the x direction plus the component in the y direction delayed by 90 degrees:

$$r(t) = x_r(t) + y_r\left(t - \frac{1}{4L_1}\right)$$

where:

r(t) is the antenna output as a fiction of time.

$x_r(t)$ is the E-field component in the receive antenna x direction.

$y_r(t)$ is the E-field in the receive antenna y direction.

$L_1$ is the carrier frequency.

This model accurately approximates the phase, but not the gain of a RHCP patch antenna.

Similarly, the incoming signal can be expressed in the transmit frame:

$$x_{tx}(t)=\cos(2\pi L_1 t)$$

$$y_{tx}(t)=e\sin(2\pi L_1 t)$$

$$\vec{E}(t)=x_{tx}(t)\hat{\imath}_{tx}+y_{tx}(t)\hat{\jmath}_{tx}$$

where:

$\vec{E}(t)$ is the vector E-field at the receive antenna.

e is the ellipticity of the incoming signal.

$\hat{\imath}$ is a unit vector in the x direction.

$\hat{\jmath}$ is a unit vector in the y direction.

The received signal is then:

$$r(t) = \hat{\imath}_r \cdot \left(\hat{\imath}_{rx} x_{tx}(t) + \hat{\jmath}_{tx} y_{tx}(t)\right) + \hat{\jmath}_r \cdot \left(\hat{\imath}_{tx} x_{tx}\left(t - \frac{1}{4L_1}\right) + \hat{\jmath}_{tx} y_{tx}\left(t - \frac{1}{4L_1}\right)\right) =$$

$$\cos(2\pi L_1 t)\left(\hat{\imath}_r \cdot \hat{\imath}_{tx} - e\hat{\jmath}_r \cdot \hat{\jmath}_{tx}\right) + \sin(2\pi L_1 t)\left(e\hat{\imath}_r \cdot \hat{\jmath}_{tx} + \hat{\imath}_{tx} \cdot \hat{\jmath}_r\right) =$$

-continued $$\cos(2\pi L_1 t)(R_{11}-eR_{22})+\sin(2\pi L_1 t)(eR_{12}+R_{21})=$$

$$\langle R_{11}-eR_{22},\ eR_{12}+R_{21}\rangle\cos\left(2\pi L_1 t+\arctan\left(\frac{eR_{12}+R_{21}}{R_{11}-eR_{22}}\right)\right)$$

where:

$R_{ij}$ is the (i,j) element of the rotation matrix from the transmit coordinate system to the receive coordinate system.

The phase term, $$\arctan\left(\frac{eR_{12}+R_{21}}{R_{11}-eR_{22}}\right),$$

represents additional delay of the received signal due to orientation. Care should be taken to "unwrap" the arc-tangent function.

$$\phi_{corrected}=\phi+f(\text{attitude, direction to satellite})$$

Typically, however, most of the error is associated with relative changes in antenna yaw. Thus, the foregoing three-dimensional (3-D) correction is not required. Instead the following approximation is preferably used, the first order correction for yaw being significantly simpler than the 3D equations. The correction for yaw is to add the heading difference between the antennas, expressed in revolutions and unwrapped, to the phases of one antenna.

There are a number of implementations for the antenna attitude sensor. Generally, the relative attitude of the antennas must be detected. This can be done in two ways: 1) measure the absolute attitude of each antenna and then derive the relative attitude changes; or 2) measure the relative attitude changes without getting the absolute attitude.

In one example, the antenna attitude sensors 120-1, 120-3 directly measure changes in the relative attitude of the antennas 110-1, 110-3. This is accomplished, for example, by measuring the absolute attitude of at least one of the antennas, assuming that the attitude of the other antenna is known, predetermined, or invariant such as antenna 110-2.

For example, a magnetic sensor such as a compass or an inertial sensor can be used to determine antenna attitude, and specifically yaw. The antenna sensor reads a direction and yaw angle such as $\alpha$ or $\mu$ for antennas 110-1 and 110-3. Static angle $\beta$ is entered by an operator for antenna 110-2, for example. This direction and angle information is then transmitted to the receiver 114 at which the position solution provided by module 117 is calculated using this direction and angle information.

In other examples, the antenna attitude sensor indirectly measures the relative attitude of the antennas. For example, this is accomplished, in one example, by monitoring control instructions for the platforms 118-1, 118-2, and 118-3. For example, where the platform is the blade of a grader, instructions to change the pitch of the blade using the grader hydraulics are used as an indirect measure of the attitude of an antenna installed on that grader blade.

Antenna Positioner

Another embodiment of the antenna attitude compensator utilizes control of the antennas' position or orientation.

In this embodiment, an actuator or operator, for example, applies a protocol for positioning the antennas to avoid changes in relative attitude between the antennas 110-1 to 110-3 of the differential carrier phase GPS system 100.

Alternatively, a passive antenna attitude positioner is used in other examples.

In another example, the antenna positioner comprises an antenna attitude sensor, which that detects the absolute or relative attitude of the antenna, in combination with an actuator that then applies feedback control in response to the sensor to reorient the antenna to avoid the changes in relative attitude of the antennas.

In the example where the antenna positioner is an operator, the operator performs a positioning protocol to avoid changes in relative attitude of the antennas.

According to one protocol, the operator or actuator points at least one of the antennas in a predetermined direction assuming that the other one or more antennas are not subject to changes in attitude, the headings being predetermined. In another example, the operator or actuator points the antennas towards each other or points some of the antennas to match the attitude of the other antenna or antennas. Typically, this will involve the operator aligning indicia or a reference mark on the antenna assembly, e.g., an arrow, to point toward a direction dictated by the alignment protocol.

Figure 2:
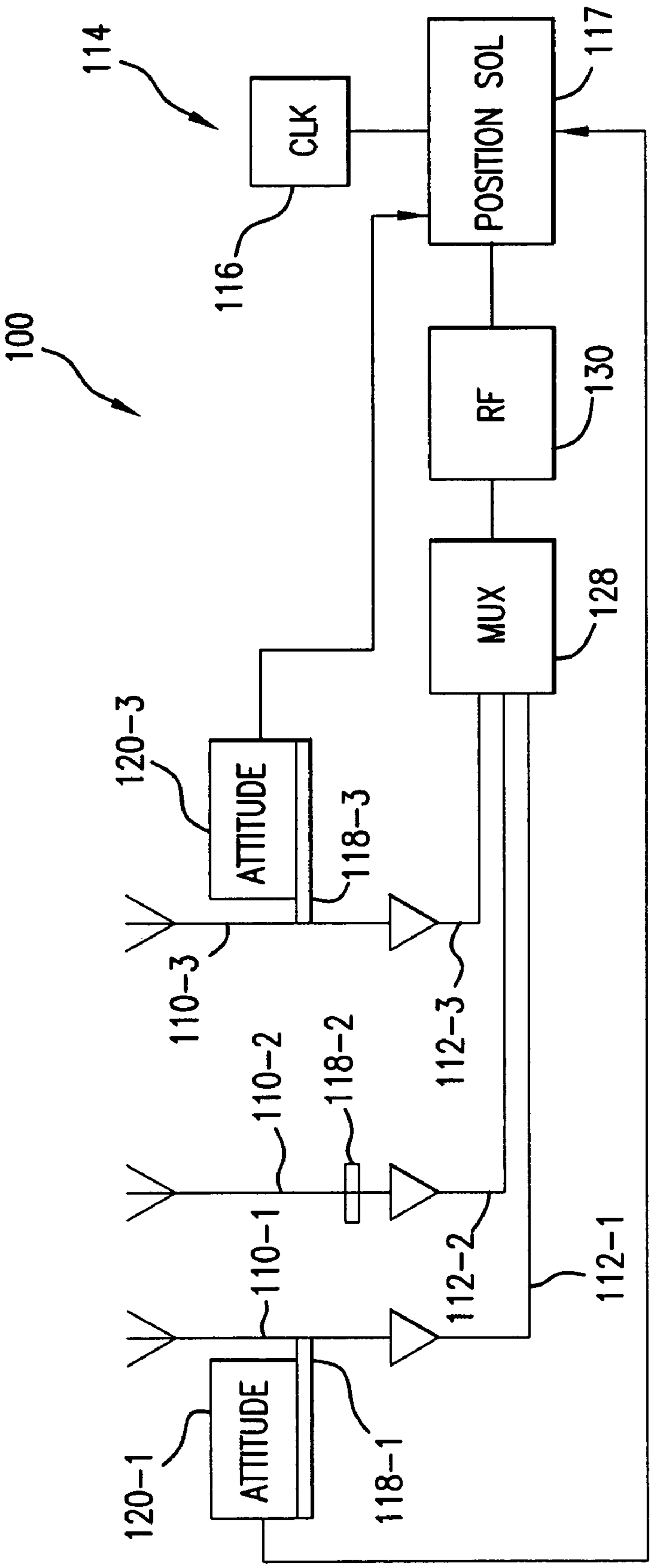
FIG. 2 is a block diagram showing a differential carrier phase GPS system including an antenna attitude compensator for providing carrier phase correction according to the present invention.

FIG. 2 is a block diagram illustrating the electronic architecture associated with the inventive position detection system 100. Specifically, the attitude compensators 120-1, 120-3 are attached to the respective antennas 10-1, 110-3 and specifically to the platforms 118-1, 118-3 in one embodiment.

Where the compensators 120-1, 120-3 function as sensors, the attitude information is transmitted to the receiver 114.

Where the compensators 120-1, 120-3, function as actuators or positioners, in other embodiments, the compensators orient their corresponding antennas 110-1, 110-3 according to one of the previously discussed protocols.

In the specific example illustrated in FIG. 2, a multiplexer 128 is provided that allows the carrier signal information on the corresponding lines 112-1, 112-2, 112-3 to be selectively transmitted to a radio frequency heterodyning stage 130. The carrier signal information is then provided to the position solution module 117, which then generates the position information for the antennas 110-1, 110-2, 110-3 by calculating the position solution. However, in another embodiment (not shown), dedicated RF channels 130 are provided for each antenna 110-1 to 110-3, avoiding the need for the multiplexer 128.

In a typical implementation of the differential carrier phase GPS system, the relative delays between each of the lines 112-1, 112-2, and 112-3 are known to the receiver 114. This allows for delay or phase compensation associated with the clock signals and carrier signals received by each of the antennas 110-1, 110-2, and 110-3. One advantage of knowing the delays is that less than four satellites are required to resolve position, since phase offsets resulting from the delays can be determined.

Figure 3A:
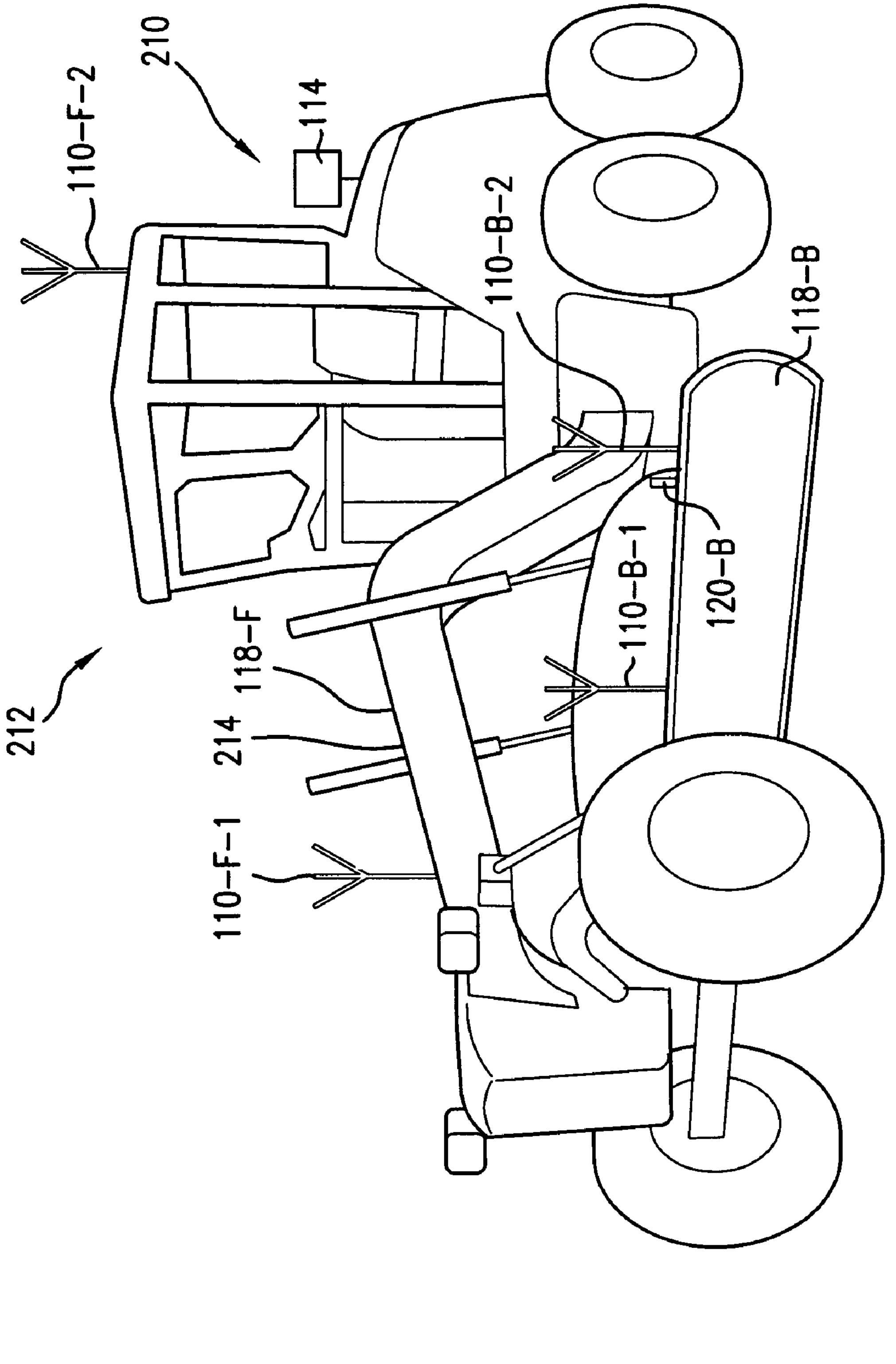
FIG. 3A is a schematic diagram showing an embodiment of the present invention used on motor grader.

FIG. 3A illustrates one application of the inventive position detection system. In this example, a series of antennas 110 are fixed to a vehicle, such as road grader 210. In other embodiments, the antennas 110 are attached to: 1) a tractor and towed/pushed implement, or 2) two parts of an articulated vehicle, such as a tractor trailer.

The road grader comprises a frame 214, to which a cab 212 is attached. In this example, two antennas are fixed relative to the frame 214. Specifically, a first antenna 110-F-1 is attached to the frame near the front of the grader 118-F and a second antenna 110-F-2 is fixed to the frame 214 via cab 212.

Providing the two antennas 110-F-1, 110-F-2 on the frame 214 enables the receiver 114 to determine the position of the road grader 210 and also its heading. This is because the antennas 110-F-1 and 110-F-2 can be located anywhere on the grader's rigid frame 214, and thus generally have good satellite visibility. As a result, they typically can see at least four satellites and therefore enable the receiver 114 to resolve the grader's position and heading. This allows the GPS signals to be used to determine antenna attitude.

The blade antennas 110-B-1, 10-B-2 that are located on the blade 118-B and are used to determine the position, angle, and rotation of the blade 118-B. This information can be derived even if the body of the grader 210 masks satellite visibility from the antennas 110-B-1, 110-B-2 because of the provision of the antenna attitude compensator 120-B. As described previously, this compensator 120-B can either be a positioner or an attitude sensor.

However, where the blade antennas 110-B-1, 10-B-2 are able to see three satellites, then the GPS receiver 114 is available to function as the attitude compensator 120-B. Thus, GPS attitude on the blade and GPS attitude on the motorgrader frame function as the attitude sensors.

Figure 3B:
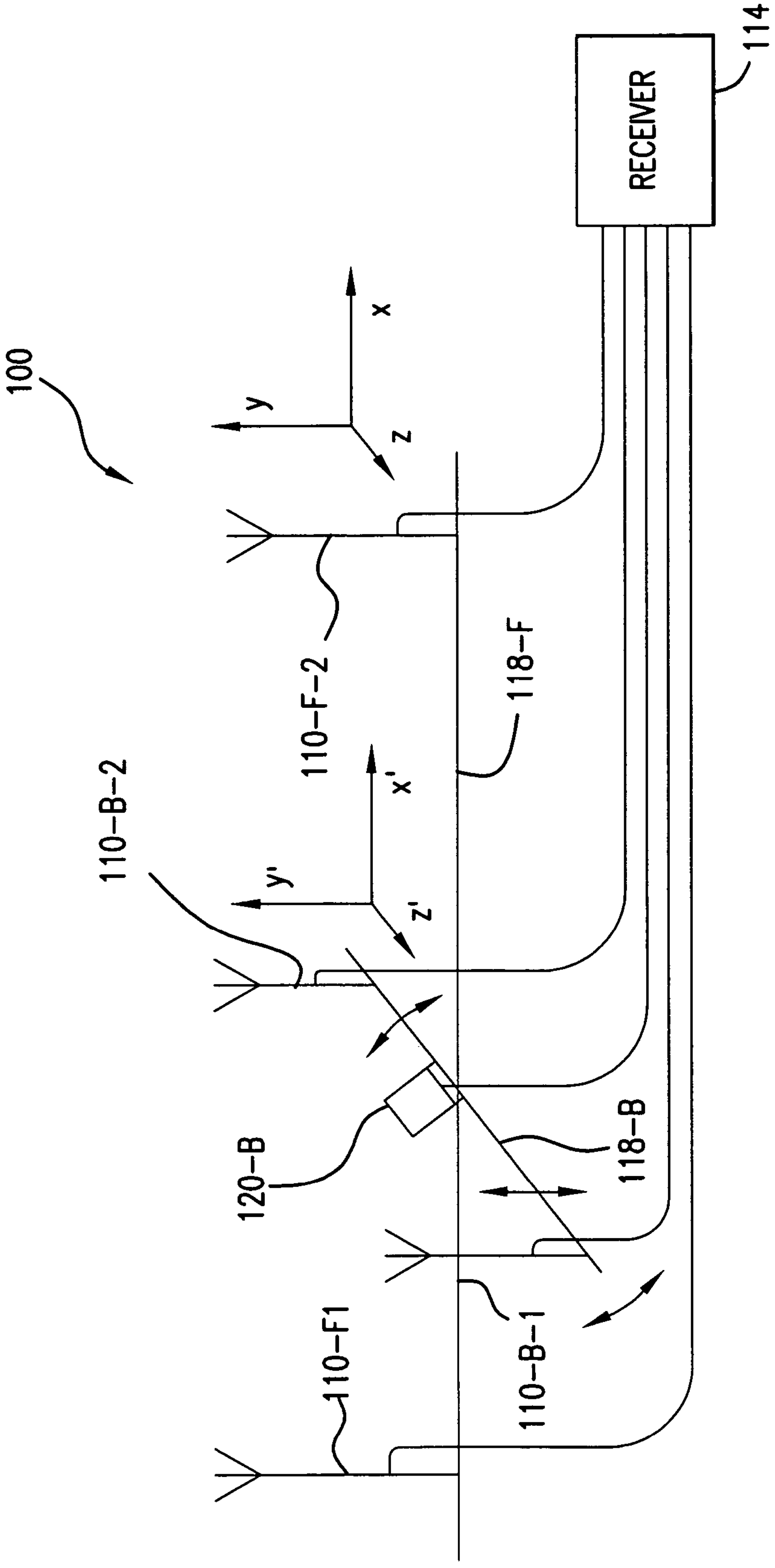
FIG. 3B is a schematic diagram illustrating the changes in relative attitude for antenna sets on the motor grader.

FIG. 3B is a block diagram illustrating the motor grader embodiment. Specifically, the frame antennas 110-F-1 and 110-F-2 are attached to the platform or frame 118-F. In contrast, blade antennas 110-B-1 and 110-B-2 are attached to the blade platform 118-B. According to this aspect of the invention, the course and position of the blade platform 118-B can still be determined with high accuracy because all of the carrier signal information from antennas 110-F-1, 110-F-2, 110-B-1, 110-B-2 is processed by the common receiver 114. Additionally, the antenna attitude compensator 120-B either corrects the attitude of the blade antennas 110-B-1 and 110-B-2 or provides antenna attitude information for the blade antennas 110-B-1, 10-B-2 to enable position and heading detection.

Figure 4A:
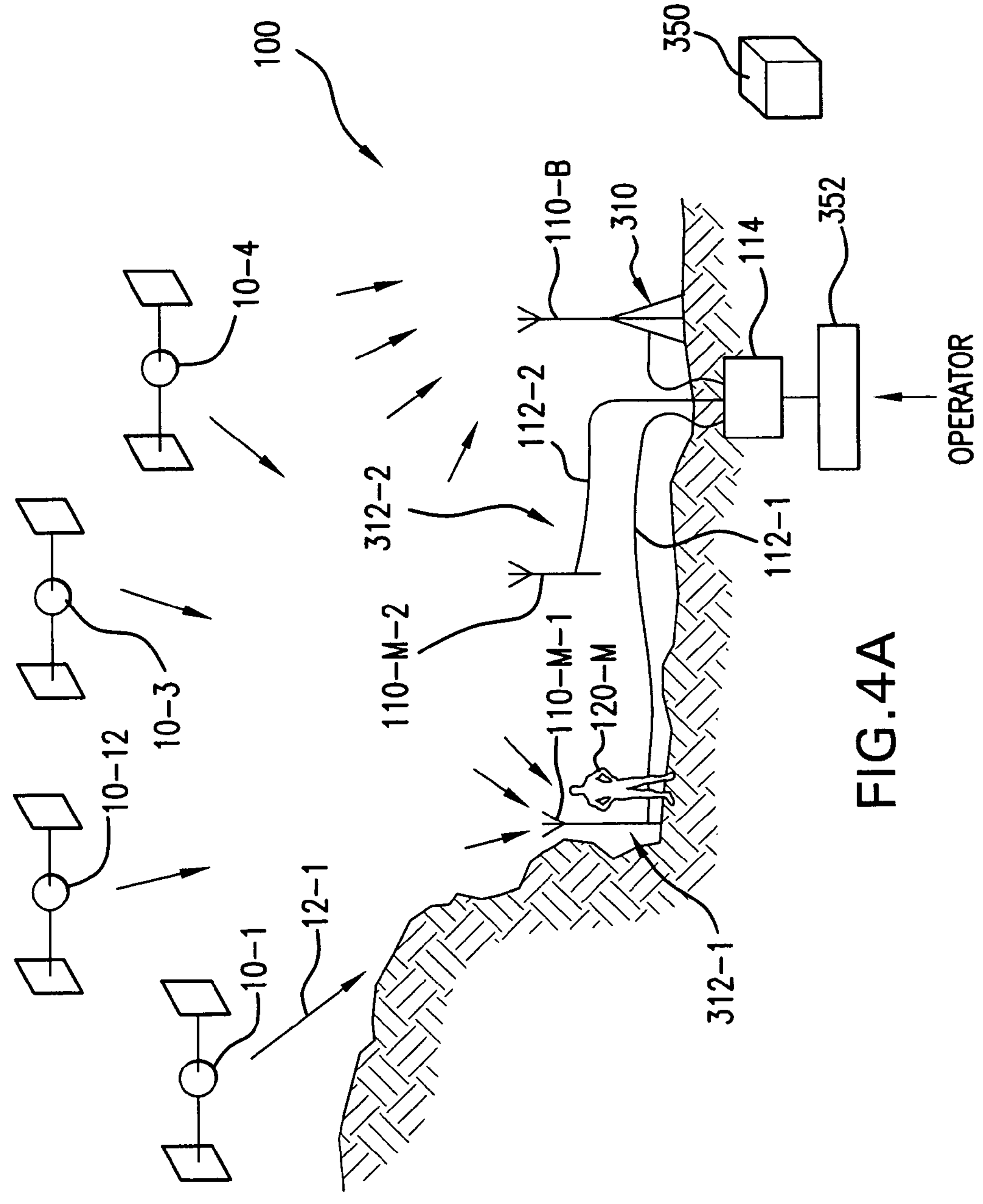
FIG. 4A is a schematic diagram illustrating an embodiment of the present invention used in surveying system.

FIG. 4A illustrates a survey embodiment of the present invention. In this embodiment, a base unit 310 is typically located in clearing that has good visibility to the GPS satellites 10-1, 10-2, 10-3, and 10-4. The receiver 114 is typically housed in the base unit 310. The receiver 114 is connected via the delay compensated transmission lines 112-1, 112-2 to respective mobile units 312-1, 312-2. Typically, the mobile units 312-1, 312-2 are portable and handled by an operator 120-M and may be located in a place that has poor satellite visibility.

For example, in the illustrated embodiment, the antenna 110-M-1 of the mobile unit 312-1 is located next to a hill, and thus cannot receive the carrier signal 12 from satellite 10-1. However, because the carrier signal information is processed by a common receiver 114 from both the base antenna 110-B and the mobile antenna 110-M-1, the position of the mobile antenna 110-M-1 can still be determined with accuracy because of the common clock signal processing.

The disadvantage associated with the use of the mobile antennas 110-M-1, 110-M-2 is that apparent ranging errors will occur if the attitude of the mobile antennas 110-M-1, 110-M-2 differs from the base antenna 110-B or change during their location and placement.

This is addressed by the inventive antenna attitude compensator 120-M. In one example, this compensator 120-M is a sensor that feeds mobile antenna attitude information to the receiver 114. In another example, a positioner compensator is used. Such positioner can be an automated actuator. However, in some surveying embodiments, the operator will function as the positioner, moving the antenna to a known orientation by applying a protocol, for example that is specified by a manual 350 for the system 100. Alternately, the protocol is communicated to the operator via a user interface 352 of the system, such as via a liquid crystal display.

Preferably, the protocol also specifies that the operator avoid phase wind-up by spinning the mobile antennas 110-M-1, 110-M-2 around their boresights during antenna placement.

In one example, the protocol is simply to orient the antennas to a predetermined attitude, such as vertical and to a proscribed compass heading. In another example, the protocol calls for orienting the attitude of the mobile antennas 110-M-1, 110-M-2 to match the base antenna 110-B. In still a further example, the two antennas 110-B, 110-M-1 are pointed towards each other.

Figure 4B:
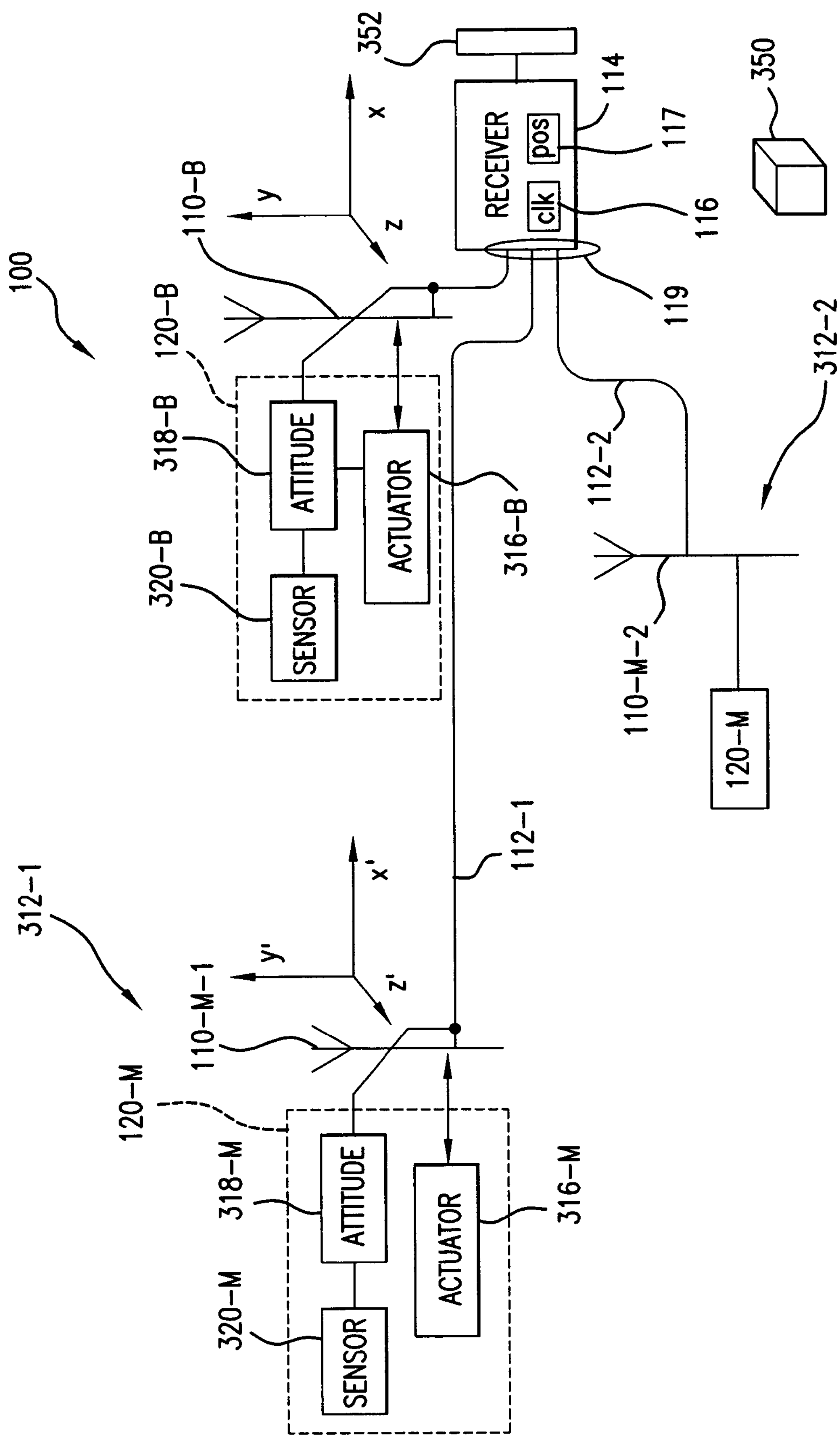
FIG. 4B is a schematic diagram illustrating the changes in relative attitude between a base station and mobile unit for the inventive surveying system.

In one implementation, once the antennas 1110-M-1, 110-M-2, 110-B are oriented according to the protocol, the operator 120-M signals the receiver 114 of the completed alignment protocol such as by operation of the system interface 352. This triggers the position solution module of the receiver 114 to calculate the position solutions for the antennas 110-M-1, 110-M-2, and 100-B FIG. 4B illustrates the hardware implementation of the surveyor embodiment.

In more detail, the survey system receiver 114 has a common clock module 116, which generates the common clock signal required to process the carrier signal information from the multiple antennas 110-M-1, 110-M-2, 110-B. This enables carrier phase kinematic GPS location of the antennas 110-M-1, 110-M-2, 110-B by the position solution module 117 of the receiver 114. Thus, the receiver 114 has antenna interfaces 119 for receiving carrier signal information from the remote and base station antennas 110-M-1, 110-M-2, 110-B.

Specifically, according to the invention, the mobile antenna 110-M-1 has a compensator 120-M, such as a sensor or positioner, e.g., operator. In one implementation, an attitude controller 318-M is provided with possibly an absolute attitude sensor 320-M. This provides attitude information for transmission to the receiver 114 and/or mobile attitude controller 318-M, which controls the actuator 316-M to position the mobile antenna 110-M-1. In one example, mobile antenna 110-M-2 is specified to be placed by the protocol to have a predetermined attitude, although it can also have its own compensator 120-M.

In other embodiments, a compensator 120-B is used for the base antenna 110-B. Specifically, the base attitude compensator 120-B in one example comprises an actuator 316-B, an attitude controller 318-B, and a sensor 320-B. The sensor 320-B detects an absolute attitude of the base antenna 110-B. This information is transmitted to the receiver 114 and/or an attitude controller 318-M that controls the actuator 316-B to position the antenna 10-B-1.

Vehicle Trailer Angle Sensing

Figure 5:
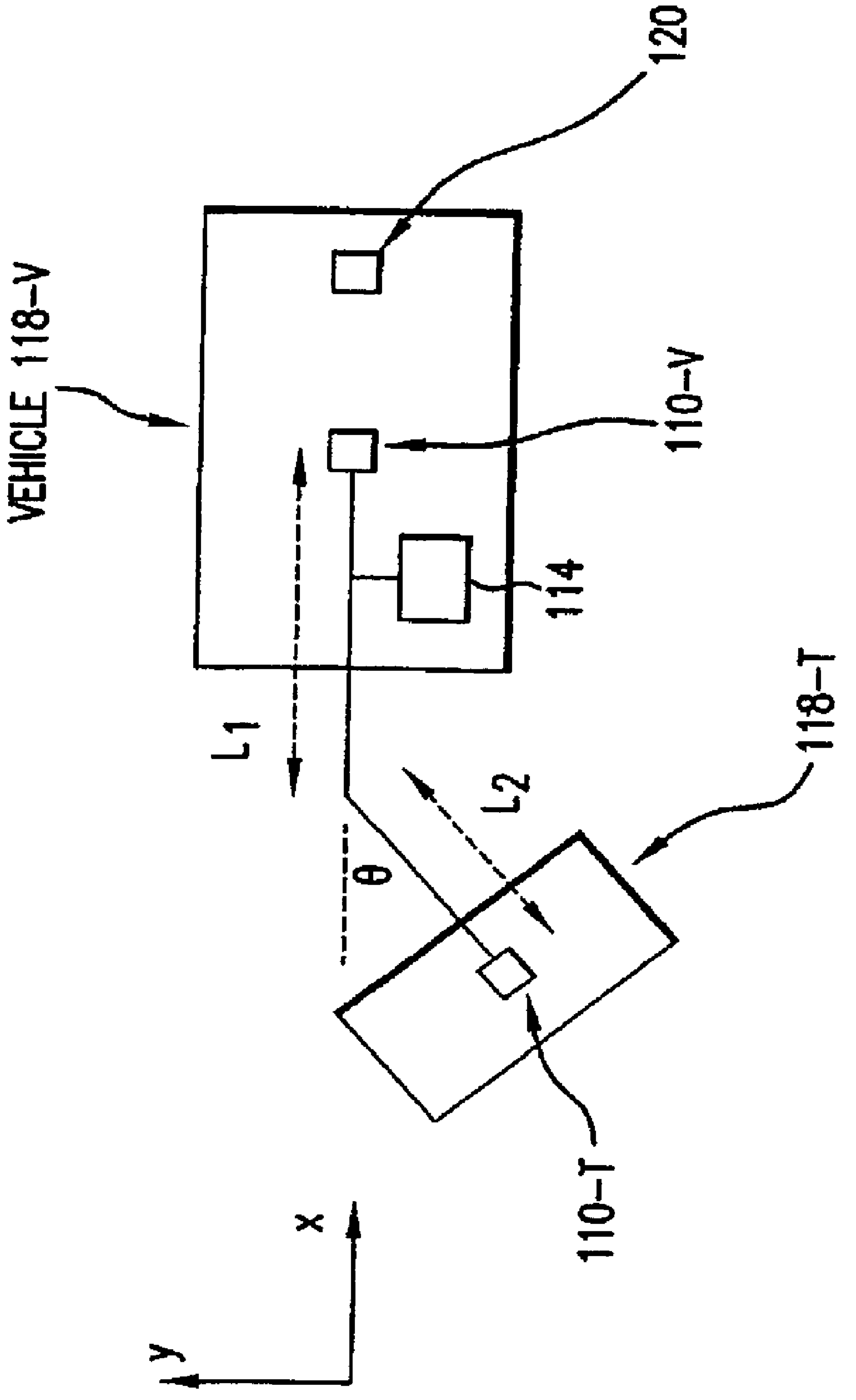
FIG. 5 is a schematic diagram showing an embodiment of the present invention for an articulated vehicle.

FIG. 5 shows an embodiment of the present invention used in an articulated vehicle system.

In more detail, in the illustrated implementation, a vehicle 118-V is pulling or towing a trailer 118-T, or other implement that is free to pivot in the lateral direction. Examples include a truck with a trailer or a farm tractor with a towed implement, such as a planter.

A single GPS receiver 114 is used with one or more antennas 110-V on the vehicle 118-V and one or more antennas 110-T on the implement or trailer 118-T. This configuration enables a position solution module in the receiver 114 to determine the angle θ of the implement 118-T relative to the vehicle 118-V, without the need for a potentiometer, encoder, or other direct angular sensor, and without the need for a heading sensor on the trailer or implement 118-T. The measurement takes advantage of the carrier phase processing as described above to determine the angle θ, even with fewer than 4 satellites tracked on the implement GPS antenna(s) 110-T.

In one implementation, vehicle antenna 110-V is placed on the vehicle 118-V, and one antenna 110-T is placed on the trailer or implement 118-T. Both antennas 110-V, 1110-T are connected to a single GPS receiver 114. In addition, an orientation (heading) sensor 120 is placed on the vehicle 118-V. This heading sensor 120, in examples, is a compass or gyroscope, as described above, and functions as an attitude sensor for the vehicle 118-V. In other implementations, the heading or attitude sensor 120 is in the form of a third GPS antenna, placed at a fixed location on the vehicle, which is also wired to the GPS receiver 114, and enables the receiver 114 to accurately determine the heading or attitude of the vehicle 118-V.

The following iterative process is then followed to compute the angle of the trailer or implement 118-T relative to the vehicle 118-V.

1. Assume that the angle θ of the trailer or implement 118-T relative to the vehicle 118-V is zero.

2. Use kinematic DGPS to compute the position of the implement antenna 118-T relative to the vehicle antenna 110-V, using a heading correction based on the latest estimate of trailer angle.

3. Use the newly computed position of the trailer antenna relative to the vehicle antenna to generate a new estimate for the trailer angle. Using the coordinate frame in the figure above, $\theta=\sin^{-1}(-y_t/L_2)$, where $y_t$ is the y coordinate of the trailer GPS antenna 110-T.

4. Look at how far the new estimate of trailer angle has changed from the last estimate. If the change is not negligible, go to step 2 and iterate.

By following the iterative process described above, the angle θ of the trailer 118-T relative to the vehicle 118-V is computed, even if the GPS antenna 110-T on the trailer 118-T is tracking only 3 navigation signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A position detection system, comprising:

a first antenna for receiving carrier signals;

a second antenna for receiving the carrier signals, the second antenna being subject to changes in attitude relative to the first antenna;

an antenna attitude compensator for providing carrier phase correction induced by the changes in relative attitude between the first antenna and the second antenna; and a receiver for processing carrier signal information from the first antenna and the second antenna in response to a common clock signal and the antenna attitude compensator.

2. A position detection system as claimed in claim 1, wherein the antenna attitude compensator comprises an antenna attitude sensor for detecting changes in relative attitude for the antennas, the receiver determining the position in response to the relative attitude of the antennas.

3. A position detection system as claimed in claim 1, wherein the antenna attitude compensator comprises an antenna positioner that controls an attitude of at least one of the antennas to avoid changes in relative attitude for the antennas.

4. A position detection system as claimed in claim 1, wherein the antenna attitude compensator uses the receiver to determine changes in relative attitude between the first set and the second set of antennas by processing the carrier signals from the antennas using the common clock signal.

5. A position detection system as claimed in claim 1, further comprising a carrier information transmission line for transmitting carrier information from at least one of the first antenna and second antenna to the receiver.

6. A position detection system as claimed in claim 5, wherein a timing delay of the carrier information transmission line is used by the receiver to process the carrier signal information.

7. A position detection system as claimed in claim 1, wherein the antenna attitude actuator points a first one of the antennas to match an attitude of a second one of the antennas.

8. A position detection system as claimed in claim 1, wherein:

the first antenna is part of a first set of antennas; and the second antenna is part of a second set of antennas.

9. A system as claimed in claim 2, wherein the antenna attitude sensor directly measures changes in the relative attitude of the antennas.

10. A system as claimed in claim 2, wherein the antenna attitude sensor is a magnetic sensor.

11. A system as claimed in claim 2, wherein the antenna attitude sensor is an inertial sensor.

12. A system as claimed in claim 2, wherein the antenna attitude sensor indirectly measures changes in the relative attitude of the antennas by monitoring control instructions indicating changes to the relative attitude.

13. A system as claimed in claim 1, wherein the antenna attitude sensor comprises two or more antennas, having a common attitude relative to each other, that receive the carrier signals, the receiver processing the carrier signal information from the two or more antennas in response to the common clock signal to determine the common attitude of the two or more antennas.

14. A system as claimed in claim 1, wherein the carrier signals are generated by a global positioning system.

15. A system as claimed in claim 14, wherein the global positioning system is the Global Navigation Satellite System.

16. A system as claimed in claim 14, wherein the global positioning system is the Global Orbiting Navigation Satellite System (GLONASS).

17. A system as claimed in claim 14, wherein the global positioning system is the Galileo System.

18. A system as claimed in claim 1, wherein the antennas are mounted on different platforms capable of relative angular motion.

19. A system as claimed in claim 1, wherein the common clock is formed by synchronizing multiple clock signals for multiple clocks for processing the carrier signals that are received by the antennas.

20. A system as claimed in claim 1, wherein the antennas are mounted on a vehicle, with a first one of the antennas rigidly mounted relative to a frame of the vehicle and a second one of the antennas mounted on a part of the vehicle that moves relative to the frame.

21. A system as claimed in claim 20, wherein the antenna attitude sensor is mounted on the part of the vehicle that moves relative to the frame.

22. A system as claimed in claim 20, wherein the part is a blade of the vehicle.

23. A system as claimed in claim 1, wherein the antennas are mounted on units that move relative to each other, at least one of the units having the antenna attitude sensor.

24. A system as claimed in claim 23, wherein both units have an antenna attitude sensor.

25. A system as claimed in claim 3, wherein the positioner comprises an operator.

26. A system as claimed in claim 3, wherein the positioner comprises an actuator.

27. A system as claimed in claim 3, wherein the positioner comprises an antenna attitude sensor for detecting an attitude of the at least one antenna, and the positioner orients said antenna in response to the attitude sensor.

28. A system as claimed in claim 1, wherein the common clock is formed by synchronizing multiple clock signals for multiple clocks for processing the carrier signals that are received by the antennas.

29. A system as claimed in claim 1, wherein the antennas are mounted on a vehicle, with a first one of the antennas rigidly mounted relative to a frame of the vehicle and a second one of the antennas mounted on a part of the vehicle that moves relative to the frame.

30. A system as claimed in claim 1, wherein the antennas are mounted on separate survey units that move relative to each other, at least one of the units having the antenna attitude sensor.

31. A system as claimed in claim 1, further comprising a user interface indicating a protocol for aligning the antennas to an operator.

32. A system as claimed in claim 1, further comprising a user interface, which an operator uses to indicate that the antennas have been aligned.

33. A system as claimed in claim 1, further comprising two or more mobile antennas.

34. A system as claimed in claim 1, further comprising a manual specifying a protocol for aligning the antennas for an operator.

35. A system as claimed in claim 34, wherein the manual instructs the operator to avoid phase wind up during placement of the base antenna and the mobile antenna.

36. A position detection system as claimed in claim 1, wherein the antenna attitude compensator provides the carrier phase correction induced by the changes in relative attitude between the first antenna and the second antenna by correcting for polarization of the carrier signals.

37. A position detection system as claimed in claim 1, wherein the antenna attitude compensator provides the carrier phase correction induced by the changes in relative attitude between the first antenna and the second antenna by correcting for right hand circular polarization of the carrier signals.

38. A position detection system as claimed in claim 1, wherein the antenna attitude compensator determines antenna yaw angle and direction to the position detection system and the position detection system uses the yaw angle and direction to determine a position solution for the antennas.

* * * * *